July 17, 1951 S. SOLOMON 2,561,149
FREQUENCY MODULATION DETECTOR CIRCUITS
Filed Sept. 10, 1945 4 Sheets-Sheet 1

A = SHUNT CIRCUIT REACTANCE
B = SERIES CAPACITOR REACTANCE
C = RESULTANT REACTANCE CURVE

INVENTOR
Saul Solomon
BY
ATTORNEY

July 17, 1951 S. SOLOMON 2,561,149
FREQUENCY MODULATION DETECTOR CIRCUITS
Filed Sept. 10, 1945 4 Sheets-Sheet 2

INVENTOR
*Saul Solomon*
BY
ATTORNEY

July 17, 1951  S. SOLOMON  2,561,149
FREQUENCY MODULATION DETECTOR CIRCUITS
Filed Sept. 10, 1945  4 Sheets-Sheet 3

INVENTOR
Saul Solomon
BY H.S. Grover
ATTORNEY

INVENTOR
Saul Solomon
BY H. S. Grover
ATTORNEY

Patented July 17, 1951

2,561,149

UNITED STATES PATENT OFFICE 2,561,149

FREQUENCY MODULATION DETECTOR CIRCUITS

Saul Solomon, Collingswood, N. J., assignor to Radio Corporation of America, a corporation of Delaware Application September 10, 1945, Serial No. 615,351

5 Claims. (Cl. 250—27)

My present invention relates generally to simplified detectors of frequency modulated (FM) carrier waves, and more particularly to improved and simplified discriminator input circuits for FM detectors utilizing a single rectifier device.

One of the important objects of my present invention is to provide frequency discrimination in an FM detector employing but a single rectifier device, such as a diode, wherein desirable characteristics are secured by virtue of series and shunt resonance adjustments.

Another important object of my present invention is to provide an FM detector circuit having a discriminator input network composed of series and shunt resonances so related as to provide essential linearity of detection over a wide frequency range; control over the limiting frequencies of detection; and more signal output by virtue of a relatively steep detection characteristic slope.

Another important object of my invention is to provide a discriminator network for angle modulated waves, wherein the network is provided with a slope characteristic whose linearity and limiting frequencies are subject to close control by virtue of the use of series and shunt resonance points in the network.

A more specific object of my invention is to provide an FM detector which consists of a diode having a parallel resonant circuit tuned to provide one limiting frequency of the detection characteristic, while the parallel resonant circuit cooperates with capacitance or inductance in the detector circuit to provide a series resonant circuit tuned to the opposite limiting frequency of the detection characteristic.

Further objects of my invention are to improve generally the simplicity, efficiency and control of FM detector circuits, and more especially to provide FM detector circuits which are economical to manufacture and assemble and utilize but a single diode rectifier. In accordance with my invention it is possible to secure detection with a single diode wherein the cathode element can be at ground potential thereby leading to the possibility of greater economy in manufacture and simplicity of wiring. The requirements of only a single cathode-grounded diode may allow the circuit use of present standard economical tube types wherein a tube contains further elements which permit this same tube to be used for other functions. Economy of manufacturing can result since by allowing sufficient area of detector slope, precise adjustments may not be required for the discriminator. Normal element drift can also be allowed for thereby permitting the use of more economical parts. The virtues of a balanced discriminator are lost to the extent that precision of discriminator adjustment fails due to element value change, or due to manufacturing tolerances in adjustment.

Still other objects of my invention will best be understood by reference to the following description, taken in connection with the drawings, in which I have indicated diagrammatically several circuit organizations whereby my invention may be carried into effect.

In the drawing:

Fig. 1 schematically shows a simple embodiment of the invention in an FM receiver system;

Figure 1:
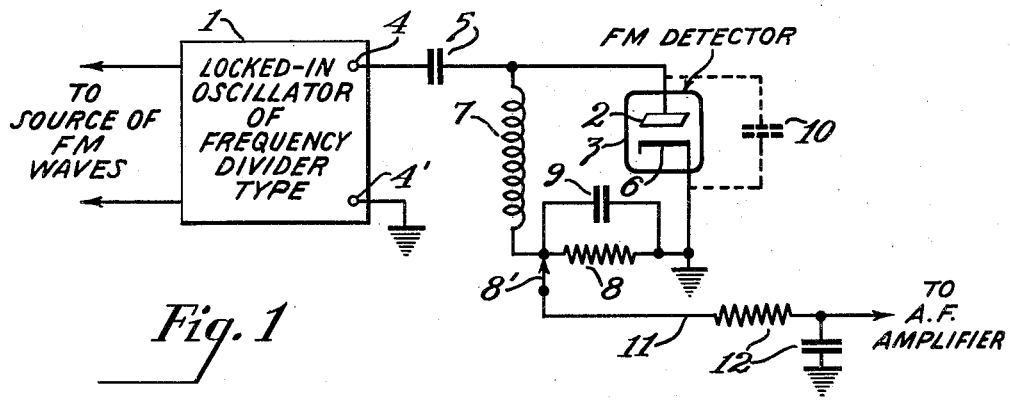

Referring now to the accompanying drawings, wherein like reference characters in the different figures designate similar circuit elements, there is shown in Fig. 1 an FM detector circuit utilizing a single rectifier. The discriminator input network provides discrimination with a minimum number of component elements. While the detector circuit may be used with any suitable source of frequency-variable waves, most satisfactory detection is secured when the discriminator input network has applied to it frequency-variable waves (such as FM carrier waves) of substantially constant amplitude. In other words, a suitable limiter is desirably inserted between the source of the FM waves and the present detector circuit. While my present description deals with FM carrier waves, it is to be clearly understood that the invention is generically applicable to angle modulated waves. By the term "angle modulated" it is intended to include phase modulated, frequency modulated, or hybrid modulations possessing characteristics common to both phase and frequency modulation.

In order to explain the functions of my present invention, it is assumed that the FM detector of Fig. 1 is employed in a superheterodyne receiver, adapted to receive FM waves, similar in design to that disclosed by George L. Beers in his U. S. Patent No. 2,356,201, granted August 22, 1944. In that type of receiver the intermediate frequency (I. F.) signal energy is applied to a locked-in oscillator of the frequency divider type. The numeral 1 in Fig. 1 designates such a locked-in oscillator. As disclosed in the Beers patent, FM waves in the 42–50 megacycle (Mc.) band are selectively amplified, and reduced in frequency to the I. F. value, for example 4.3 mc. The invention is not restricted to any specific frequency values or ranges.

As is well known to those skilled in the art of radio communication, in the present FM broadcast band (42–50 mc.), the carrier is deviated ± 75 kc. (kilocycles), although at the receiver selector circuits are permitted to pass a band ± 100 kc. to take care of tolerances. In the Beers system the locked-in oscillator has applied to it the I. F. signal energy having a center frequency of 4.3 mc., and a maximum frequency deviation of ± 75 kc. The output energy of the locked-in oscillator, which may have a division ratio of 5:1 (or any other suitable deviation ratio as 3:1, 4:1) has a center frequency of 860 kc. and a maximum frequency deviation of ± 15 kc. In actual practice it is found that the output circuit of the locked-in oscillator 1 has a current flow of substantially constant amplitude. Accordingly, my present invention is readily applied to the output circuit of such a locked-in oscillator network. I prefer to use a frequency dividing locked-in oscillator network of the type shown in Fig. 9 to be later described.

In accordance with my present invention, I connect the anode 2 of diode rectifier 3 to the high potential output terminal 4 of locked-in oscillator 1 through coupling condenser 5. The cathode 6 is returned to the grounded output terminal 4' of the oscillator 1. Coil 7 and load resistor 8 are connected in series between the anode 2 and the grounded cathode 6. The load resistor 8 is shunted by the high frequency bypass condenser 9. The anode to cathode capacitance of the diode is indicated in dashed lines by the numeral 10. The modulation frequency (audio frequencies in the specific case of FM broadcast reception) voltage is taken off from the anode end of resistor 8. An adjustable tap 8' may be used to adjust the magnitude of the audio signals fed to the grid of a following audio frequency amplifier tube (not shown) through the lead 11, which may include a high frequency filter 12. The diode 3 may be of any known and suitable type. For example, tubes of the 6SQ7 or 6AQ6 types may be used, since the cathode of the diode is grounded.

Assuming, by way of specific illustration, that the I. F. signal energy applied to the locked-in oscillator has had its center frequency divided from 4.3 mc. to 865 kc. with a frequency deviation of ± 15 kc., the discriminator input circuit of diode 3 needs only to be adjusted in the manner now to be explained in order to provide controlled linear detection. I provide a linear discrimination characteristic by choosing the magnitude of coil 7 so as to shunt resonate with capacitance 10 to a frequency slightly higher than the center frequency (865 kc.) of the FM energy between terminals 4, 4'. By employing the inherent diode capacitance and coil distributed capacity there is avoided the need for a special tuning condenser across coil 7 to provide the shunt resonance point.

The discriminator input network is, also, given a series resonance point by utilizing either condenser 5 or condenser 9, or both. Assuming that condenser 9, coil 7 and capacitance 10 provide the series resonance point, the frequency of the latter will desirably fall below the center frequency by a frequency value substantially equal to the frequency spacing between the center frequency (Fc) and the shunt resonance. Ideally, the series and shunt resonances are controlled so that the slope of the frequency response curve of the entire network is linear, and sufficiently steep to provide a maximum linear rectified output over the entire frequency swings or deviations of the FM energy at terminals 4, 4'.

Figure 2:
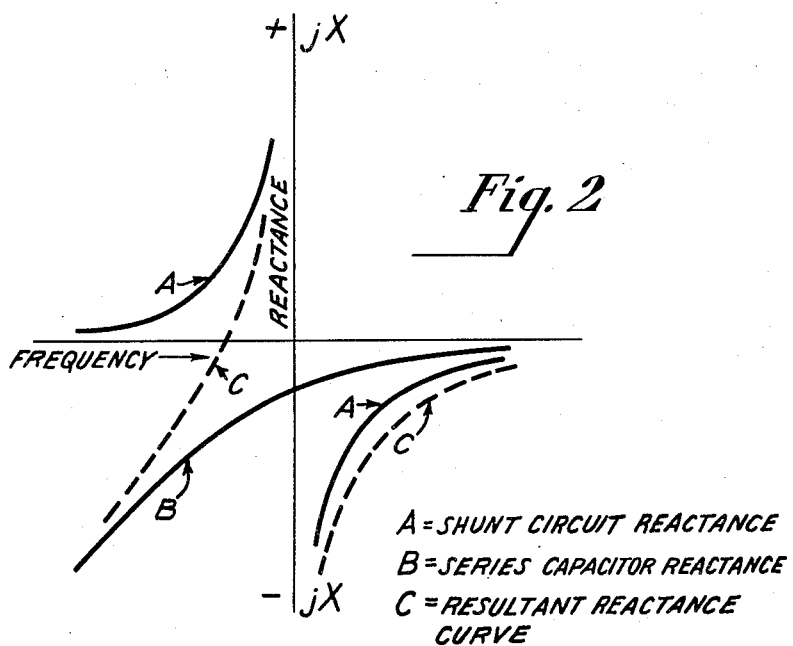
Fig. 2 illustrates graphically the basis of the invention.

In Fig. 2 I have depicted in a simplified manner the theoretical basis for the functioning of my present invention. There is plotted "Frequency" as abscissae against "jX (Reactance)" as ordinates. The solid line curves A and B are respectively representative of the shunt circuit reactance and series capacitor reactance. The curves C (shown in dashed lines) illustrate the appearance of the resultant reactance curve.

To explain the significance of Fig. 2 more fully, curve B to the left of the ± jX axis represents a negative reactance (for example, condenser 9) which is added to the positive reactance curve A (resulting from shunt circuit 7, 10) to give curve C. In Fig. 1 the capacitance 10 is assumed to be the distributed capacitance of coil 7 and the inherent diode capacitance, while in Fig. 9 it is an actual shunt condenser. Curve C, then, gives the resultant reactance by direct addition of curves A and B, and is the reactance portion of the impedance of the three element circuit 7, 10, 9 as seen at the diode electrodes 2, 6.

It will be noted that the positive (or inductive) reactance variation has been rendered highly linear over a considerable frequency range. Translated into terms of the impedance variation of the diode input circuit with frequency, the curve C of Fig. 2 signifies that one of the slopes of the response curve has been rendered linear over a substantial frequency range. The value of Fc is located at the center of the linear section of such slope.

Figure 3:
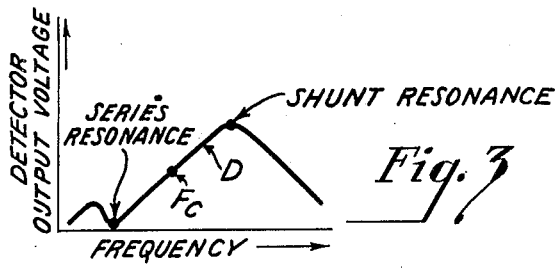
Fig. 3 is an illustrative "Frequency vs. Detector Output Voltage" characteristic curve.

In Fig. 3 I have represented, in a purely illustrative manner, the "Frequency vs. Detected Output Voltage" characteristic of the FM detector circuit of Fig. 1. It will be noted that curve D has shunt and series resonances located respectively at the high and low frequency limits of the linear slope. The midpoint of the slope is designated Fc to indicate that the shunt and series resonant frequencies will be at substantially Fc+15 kc. and Fc−15 kc. respectively. The small frequency peak below the series resonance is due to the negative reactance of curve C in Fig. 2. It will be seen that by suitable choice of the constants of the input network of the diode 3, the linearity and slope and extent thereof may be controlled. Those skilled in the art are aware of the fact that there is developed between the upper end of coil 7 and ground a high frequency voltage whose amplitude varies in accordance with the frequency deviations of the FM energy at terminals 4, 4'. This variable-amplitude voltage is rectified by the diode 3, and the rectified voltage across resistor 8 is representative of the frequency modulation of the signals applied to locked-in oscillator 1.

Figure 4:
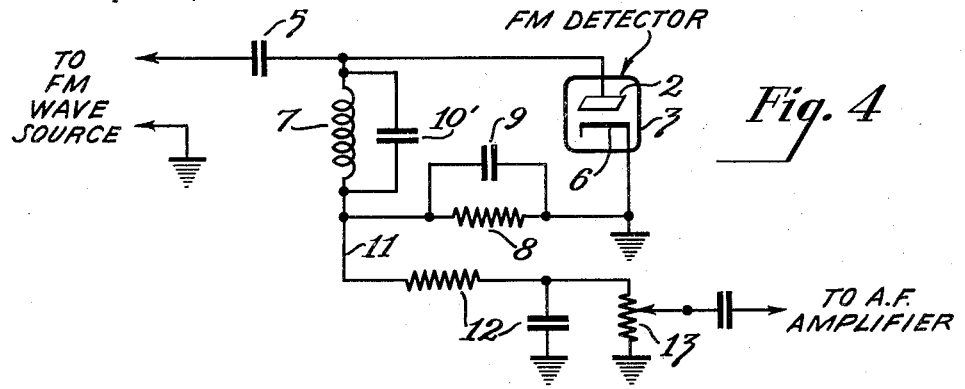
Fig. 4 shows a modified embodiment of the invention.
Figure 5:
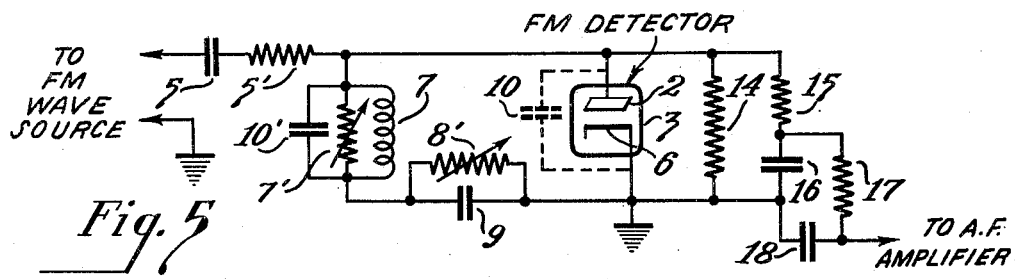
Fig. 5 shows a further modification.

The modification in Fig. 4 essentially differs from the circuits shown in Fig. 1 in that the diode capacitance 10 is not utilized alone for tuning coil 7 to the shunt resonance. Instead, condenser 10' is shunted across coil 7, and the parallel resonant circuit 7, 10' is tuned to the shunt resonant frequency. The tube capacity always combines with condenser 9 to place a shunt capacity across the tuned circuit, which is in addition to condenser 10'. The series resonance is provided by the combination of condenser 9 with parallel resonant circuit 7, 10'. Additionally, the lead 11 is fixed in its connection to the lower end of coil 7, while the potentiometer 13 is connected across the low pass filter network 12. As previously explained, the constants of the input circuit of diode 3 will be so chosen that circuit 7, 10' is tuned to the series resonance point. The following specific magnitudes are given by way of illustration for the circuit arrangement of Fig. 4, but it is to be clearly understood that these values are in no way restrictive:

Condenser 10'=15 micro-micro-farads (mmf.)
Condenser 9=10 mmf.
Condenser 12=39 mmf.
Resistor 8=180,000 ohms
Resistor 13=1 megohm In Fig. 5 I have shown a further modification of the present FM detector circuit, and this modification is a preferred embodiment of my invention. It will be understood that the signal input leads to the coupling condenser 5 in each of Figs. 4 and 5 will be connected to a source of FM waves of substantially constant amplitude. However, my present discriminator circuit will function even though the input waves have an appreciable amount of amplitude variation. Optimum operating results will be secured when the input signals are substantially free of amplitude variations. In the circuit of Fig. 5 the diode 3 has its anode 2 connected to the coupling condenser 5 through the resistor 5'. As in Fig. 4, the parallel resonant circuit 7, 10' has its high potential side connected to the anode 2, while its low potential side is connected to the grounded cathode through condenser 9 which is shunted by resistor 8'. Preferably resistor 8' is adjustable to have its magnitude varied (although this is not necessary) in order to adjust the "Q" of the series resonant circuit.

Condenser 9 resonates with parallel resonant circuit 7, 10' to provide the series resonance point. Of course, the coil 7 and shunt condenser 10' provide the shunt resonance. The load resistor for diode 3 is provided by the resistance 14, which is connected between anode 2 and the grounded cathode 6. The inherent capacitance 10 of diode 3 may be considered as a radio frequency bypass capacitor across the diode load resistor. Across the diode load resistor 14 are connected series-arranged resistor and capacitor 15, 16, and in shunt to the latter is connected series-arranged resistor and capacitor 17, 18. They provide a de-emphasis circuit. Suitable constants for the de-emphasis circuit are about 100 microseconds time constant and 6 decibels per octave attenuation. The arrow through resistance 7' in shunt across circuit 7, 10' indicates that the magnitude of the resistor 7' may be varied to determine the "Q" of the shunt resonant circuit. The modulation signal voltage is taken off from across condenser 18 which is arranged in series with resistor 17, and both resistor 17 and condenser 18 in combination with resistor 15 and capacitor 16 are shunted across the load resistor 14.

Figure 6:
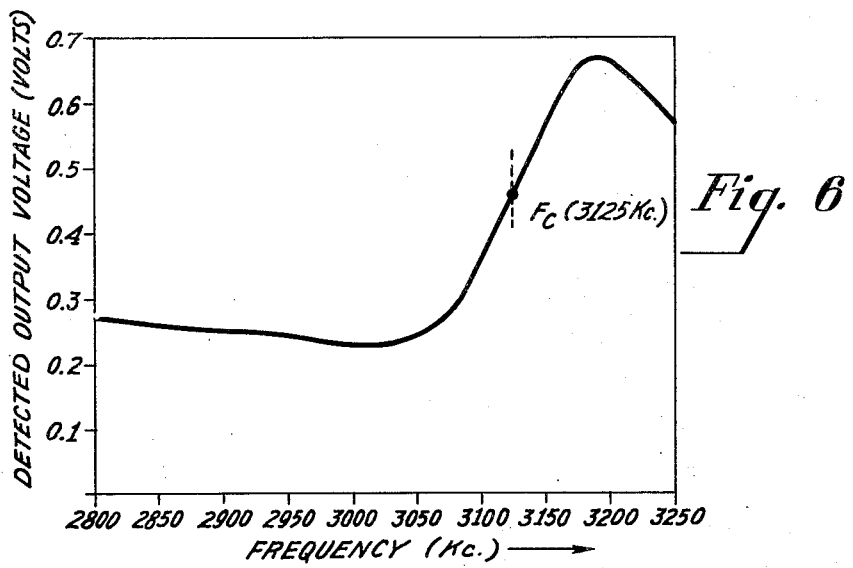
Fig. 6 is a measured curve of the circuit of Fig. 5.

In Fig. 6 there is shown the measured "Frequency vs. Detector Output Voltage" curve of a circuit constructed substantially in accordance with Fig. 5. In securing the curve shown there was applied to the locked-in oscillator 1, feeding the coupling condenser 5, I. F. signals whose center frequency was 12.5 mc. The locked-in oscillator provided at 4:1 frequency division, and, accordingly, the center frequency of the FM energy applied to the input circuit of diode 3 was 3.125 mc. (3125 kc.). An input voltage of about 2 volts was applied to the coupling condenser 5. The following specific circuit values were employed:

Resistor 5'=27,000 ohms
Resistor 14=180,000 ohms
Resistor 15=220,000 ohms
Resistor 17=82,000 ohms
Condenser 10'=23 mmf.
Condenser 9=7 mmf.
Condenser 16=75.0 mmf.
Condenser 18=150 mmf.

It will be noted from Fig. 6 that between the frequency limits of 3100 kc. and 3150 kc. the detection is absolutely linear. Furthermore, it will be observed that the linearity exists over a frequency deviation range of ±25 kc. Since the locked-in oscillator divided the frequency deviation by a factor of 4 it was necessary to handle ±18 kc. It is obvious from the measured curve of Fig. 6 that the degree and extent of linearity, as well as the slope of the linear variation of the curve, are highly desirable, and can adequately handle the frequency deviations applied to the discriminator input circuit.

It will, also, be noted that the shunt resonance point of the measured curve falls close to 3200 kc., while the series resonance point falls close to 3000 kc. I have found, in addition, that the extent of the linear section of the detection characteristic can be readily varied by changing the magnitude of the capacitor 9. For example, if the magnitude of capacitor 9 is doubled (say from 7 to 14 mmf.) a substantial change in the discrimination characteristic may be secured. This indicates the flexibility of control which exists over a discriminator circuit constructed in accordance with my present invention.

Figure 7:
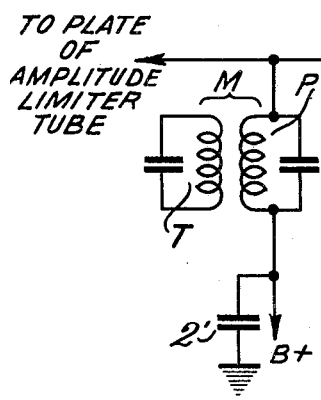
Figs. 7, 8 and 9 illustrate still further modifications.
Figure 7:
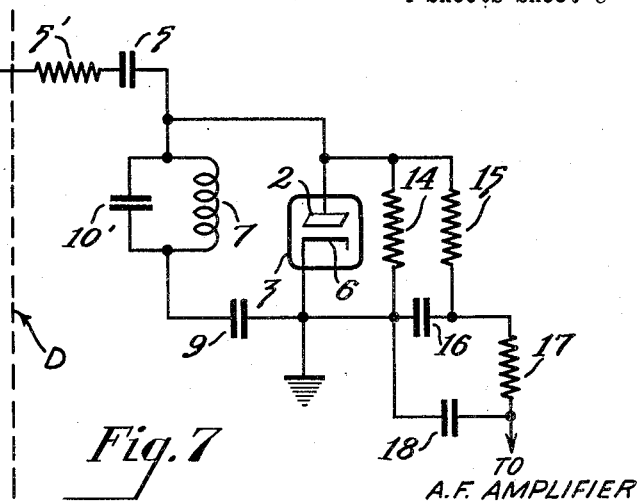
Figure 8:
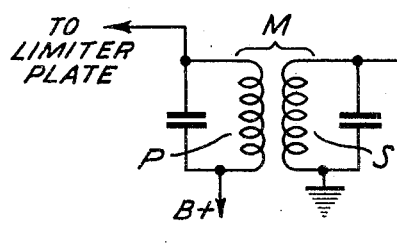

I have stated previously that my present detector circuit is adapted for use with any source of frequency-variable waves of substantially constant amplitude. In Figs. 7 and 8 I have shown two respectively different methods of coupling the input terminals of the detector circuit of Fig. 5 to the output network of any suitable and conventional form of amplitude limiter tube. Those skilled in the art of radio communication are fully acquainted with the connections and constants of an amplitude limiter tube, and for this reason it is not believed necessary to show the circuit connections of the limiter tube.

In Fig. 7 I have shown an FM detector circuit constructed in accordance with my present invention, and the detector circuit is substantially that shown in Fig. 5. It will be understood that adjustable resistors 7' and 8' may be utilized in Fig. 7 in the manner shown in Fig. 5. The vertical dash line D signifies substantial independence between the electrical characteristics of the FM detector circuit and the plate network of a prior amplitude limiter tube.

The resonant circuit P is the tuned output circuit of the limiter tube, and the B+ voltage line of the circuit is by-passed to ground by a radio frequency bypass condenser 2′. The resonant circuit T is coupled to circuit P. Each of circuits P and T is tuned to the operating I. F. value. For example, and referring to Fig. 6, the resonant frequency of each of circuits P and T could be 3125 kc., where the latter is the I. F. value. The high potential terminal of circuit P is connected to the high potential side of circuit 7, 10′ through the series path consisting of resistor 5′ and condenser 5. By proper adjustment of the coupling M between circuits P and T comprising the limiter tube plate load, constant signal amplitude output results. The discriminator, in effect, is isolated from affecting the limiter plate load circuits, and can be coupled either to the primary circuit P or the secondary circuit T. Circuit T acts in combination with circuit P to offer a tuned plate load to the tube that allows constant voltage output over the operating frequency range.

In Fig. 8 I have shown a modification of the coupling network between the limiter tube plate and the vertical line D. The difference between the circuit of Fig. 8 and that of Fig. 7 resides in the fact that the plate circuit P is reactively coupled to secondary circuit S, and the latter is connected to the input terminals of the detector circuit shown in Fig. 7. Of course, each of circuits P and S is tuned to the operating I. F. value. Here, again, the proper adjustment of the coupling M will provide substantially constant signal amplitude.

Figure 9:
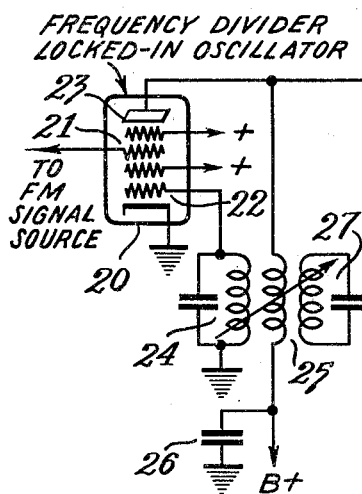
Figure 9:
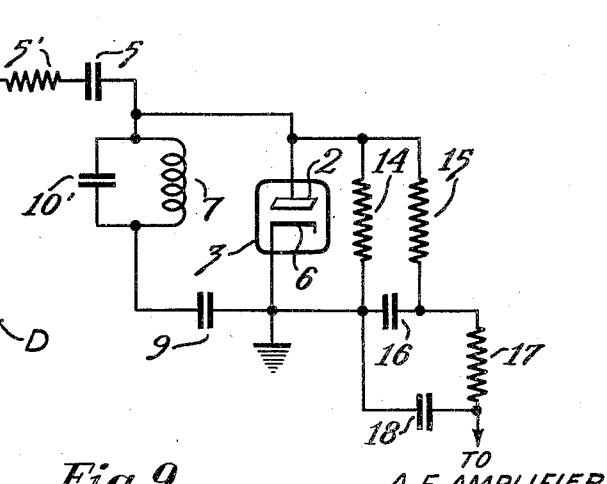

In Fig. 9 I have shown a preferred embodiment of the frequency-dividing, locked-in oscillator 1 of Fig. 1. The detector circuit to the right of vertical line D is, again, the FM detector circuit of Fig. 5. The network to the left of the vertical line includes the circuits of the frequency-dividing, locked-in oscillator. I have shown only so much of the locked-oscillator circuits as is essential to a proper understanding of this modification of the invention. Reference is made to application Serial No. 596,474 of M. S. Corrington, filed May 29, 1945, now U. S. Patent No. 2,438,585 for the specific circuit details of the locked-in oscillator tube 20 and its various electrodes. It is sufficient for the purposes of the present application to point out that the I. F. signals, which may have a frequency value of 8.25 mc., are applied to input grid 21 of the oscillator tube 20. The cathode of the oscillator tube is connected to ground, and grid 22 functions as the oscillation control grid. Suitable positive shielding grids may be used, while the numeral 23 denotes the anode or output electrode of the oscillator tube.

The resonant oscillator circuit 24, 25 is tuned to a frequency of 2.0625 mc. In other words, a 4:1 frequency division is effected by the locked-in-oscillator circuit. The coil 25, which is arranged in the plate circuit of the oscillator tube, is magnetically coupled to the oscillation grid circuit 24. Plate coil 25 can be designed so that it is tuned by its distributed capacity and the tube plate capacity. If desired, the coil of circuit 24 may be tuned by distributed capacity. The B+ line is bypassed to ground by condenser 26 for high frequency currents. In accordance with the aforesaid Corrington disclosure the circuit 27, which is also resonated to the divided frequency of 2.0625 mc., is magnetically coupled to the plate coil 25 and the grid circuit 24. The arrow through circuit 24, coil 25 and circuit 27 signifies an adjustable coupling between three circuit elements. As explained in the aforesaid Corrington application, suitable adjustment of the coupling between the three circuit elements provides a substantially wide lock-in range for the locked-in oscillator system. In Fig. 9 I have shown the input terminals of the FM detector circuit coupled across the plate coil 25. In a circuit of the type shown in Fig. 9 there is substantial independence between the characteristics of the discriminator circuit and those of the locked-in oscillator. The lock-in range of the locked-in oscillator practically is independent of the constants of the subsequent discriminator circuit.

Figure 10:
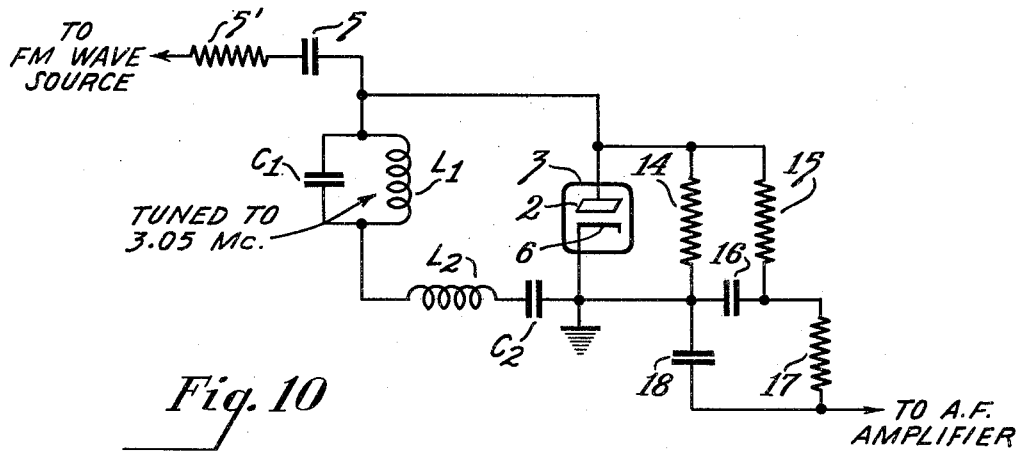
Fig. 10 illustrates a further modification.
Figure 12:
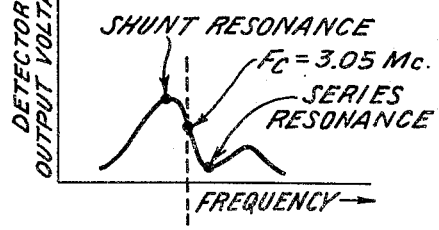
Fig. 12 shows the "Frequency vs. Detector Output Voltage" characteristic of Fig. 10.

In Fig. 10 I have shown a modified form of discriminator input circuit for diode rectifier 3. The parallel resonant circuit $C_1L_1$ is tuned to 3.05 mc. Its high potential side is connected to the series resistor-condenser path 5′, 5, as well as to the diode anode 2. The low potential side of the circuit $C_1L_1$ is connected by series-connected coil $L_2$ and condenser $C_2$ to the grounded cathode 6. Condenser $C_2$ serves as a direct current blocking condenser to keep the diode load from being shorted out. The coil $L_2$ may have a value of 0.35 mh.; condenser $C_1$ may be 25 mmf., and condenser $C_2$ may be 300 mmf. The coil $L_1$ preferably has a core for adjusting its inductance so that the overall circuit ($L_1$, $C_1$, $L_2$, $C_2$ plus diode capacitance) shunt resonance point, as illustrated in Fig. 12, is lower than 3.05 mc. The amount below the operating frequency required for this shunt resonance point depends on the actual circuit design factors. Coil $L_2$ performs a similar function in Fig. 10, as capacitor 9 performs in Fig. 1. That is, coil $L_2$ series resonates in combination with the shunt resonant circuit, in this case to a frequency higher than the operating frequency. If desired, $C_2$ may be chosen so that $L_2$ can be modified in physical form.

Figure 11:
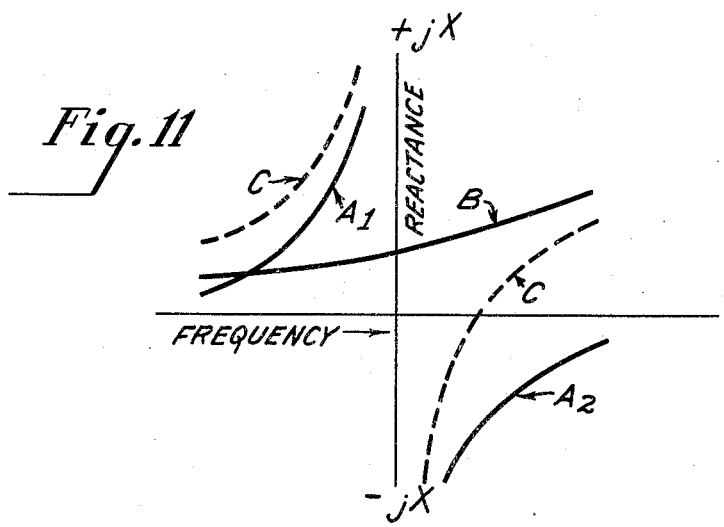
Fig. 11 shows an illustrative characteristic of the form of circuit of Fig. 10.

In Fig. 11 I have shown the "Frequency vs. Reactance" characteristics of the discriminator circuit of Fig. 10. This figure is similar to Fig. 2, and the curves have similar significance. Solid line curves $A_1$ and $A_2$ denote the positive and negative shunt circuit reactances of shunt circuit $L_1C_1$. Solid line curve B shows the series circuit reactance of $L_2$, while the resultant reactance curves C (dashed lines) are derived from curves $A_1+B$ and $A_2+B$. The corresponding "Frequency vs. Detected Output Voltage" characteristic is shown in Fig. 12. The slope between the shunt and series resonance points is substantially linear about the operating point of 3.05 mc.

While I have indicated and described several systems for carrying my invention into effect, it will be apparent to one skilled in the art that my invention is by no means limited to the particular organization shown and described, but that many modifications may be made without departing from the scope of my invention.

What I claim is:

1. A frequency variation detector comprising a pair of input terminals upon which are impressed frequency modulated signals having a predetermined mean frequency, a network connected between said input terminals consisting of a tuned circuit shunt resonant to a frequency above said mean frequency, a condenser series resonating said shunt resonance circuit to a frequency below said mean frequency, a single rectifier having input terminals coupled to the entire network consisting of said tuned circuit and condenser, and a load impedance element shunting said rectifier.

2. In a frequency modulation receiver, a frequency variation detector consisting of a rectifier having a pair of input terminals, a frequency discriminator consisting of a two-terminal network connected across said input terminals, said two-terminal network providing shunt resonance at a predetermined frequency and series resonance at a frequency different from said predetermined frequency, and a load impedance element shunting said rectifier.

3. In a detector of frequency modulated signals, a single diode having a cathode and an anode, a load resistor connected between said cathode and said anode, a shunt resonant input circuit tuned above the mean frequency of said signals by a predetermined value, a condenser connected in series between a terminal of said resonant circuit and said cathode, the other terminal of said resonant circuit being connected to said anode, said condenser series resonating said resonant circuit to a frequency less than the mean frequency substantially by said predetermined value, and resistors individually shunting said resonant circuit and said condenser.

4. In a detector of frequency modulated signals, a single diode having a cathode and an anode, a shunt resonant input circuit tuned above the mean frequency of said signals by a predetermined value, a resistor connected in series between a terminal of said resonant circuit and the cathode of said diode, a condenser in shunt with said resistor for series resonating said resonant circuit to a frequency less than the mean frequency substantially by said predetermined value, the other terminal of said resonant circuit being connected to said anode, and a load resistor in shunt with said diode and in shunt with said resonant circuit and said condenser.

5. In a frequency modulation detection circuit, a single diode having a pair of input terminals, a load resistor in shunt across said diode, a parallel resonant circuit tuned to a frequency lower than a predetermined operating frequency, a coil and a capacitor connected in series between a terminal of said parallel resonant circuit and one of said input terminals for series resonating said parallel resonant circuit to a frequency higher than said predetermined operating frequency, the other terminal of said parallel resonant circuit being connected to the other one of said input terminals.

SAUL SOLOMON.

REFERENCES CITED

The following references are of record in the file of this patent:

UNITED STATES PATENTS

| Number | Name | Date |
|---|---|---|
| 2,276,672 | Roberts | Mar. 17, 1942 |
| 2,282,961 | Harris | May 12, 1942 |
| 2,312,070 | Bliss | Feb. 23, 1943 |
| 2,337,392 | Hunt | Dec. 21, 1943 |
| 2,341,240 | Reid | Feb. 8, 1944 |
| 2,356,201 | Beers | Aug. 22, 1944 |
| 2,397,840 | Crosby | April 2, 1946 |
| 2,410,983 | Koch | Nov. 12, 1946 |
| 2,412,482 | Vilkomerson | Dec. 10, 1946 |
| 2,467,035 | Huxtable | Apr. 12, 1949 |

OTHER REFERENCES

Transmission Networks and Wave Filters; by Shea D. Van Nostrand Co., 1929. Chapter V, pages 124–140.